US00RE49395E

(19) United States
(12) Reissued Patent
Zhu et al.

(10) Patent Number: US RE49,395 E
(45) Date of Reissued Patent: Jan. 24, 2023

(54) SERVICE IMPLEMENTATION METHOD, APPARATUS, AND SYSTEM

(71) Applicant: HUAWEI TECHNOLOGIES CO., LTD., Guangdong (CN)

(72) Inventors: Fenqin Zhu, Shanghai (CN); Yan Li, Beijing (CN); Wei Lu, Shanghai (CN)

(73) Assignee: Huawei Technologies Co., Ltd., Shenzhen (CN)

(21) Appl. No.: 16/418,645

(22) Filed: May 21, 2019

Related U.S. Patent Documents

Reissue of:

(64) Patent No.: 9,661,606
Issued: May 23, 2017
Appl. No.: 14/474,744
Filed: Sep. 2, 2014

U.S. Applications:

(63) Continuation of application No. 13/729,274, filed on Dec. 28, 2012, now Pat. No. 8,862,163, which is a continuation of application No. PCT/CN2010/074629, filed on Jun. 28, 2010.

(51) Int. Cl.
*H04W 4/00* (2018.01)
*H04W 68/00* (2009.01)
(Continued)

(52) U.S. Cl.
CPC ..... *H04W 68/00* (2013.01); *H04W 4/90* (2018.02); *H04W 4/00* (2013.01); *H04W 88/16* (2013.01)

(58) Field of Classification Search
CPC ..... H04W 4/90; H04W 68/00; H04W 68/04; H04W 12/06; H04W 4/00; H04W 88/16
See application file for complete search history.

(56) References Cited

U.S. PATENT DOCUMENTS 8,428,625 B2 4/2013 Ramankutty et al.
2008/0226053 A1* 9/2008 Takahashi ..... H04M 3/42187 379/208.01
(Continued)

FOREIGN PATENT DOCUMENTS

CN 1167559 9/2004
CN 1167559 C 9/2004
(Continued)

OTHER PUBLICATIONS

European Search Report dated May 3, 2013 in corresponding European Patent Application No. EP 10842864 (9 pages).
(Continued)

*Primary Examiner* — Ovidio Escalante
(74) *Attorney, Agent, or Firm* — Fish & Richardson P.C.

(57) ABSTRACT

A service implementation method, apparatus, and system are disclosed. The service implementation method includes: receiving, by a serving gateway, a data packet of a terminal device sent by a packet data network gateway; if the data packet is a data packet with a serving priority and the serving gateway has sent a paging trigger message with a serving priority to a mobility management element, skipping, by the serving gateway, sending a paging trigger message to the mobility management element; or if the data packet is a data packet with a serving priority and the serving gateway has sent no paging trigger message with a serving priority to a mobility management element, sending, by the serving gateway, a paging trigger message to the mobility management element; wherein the paging trigger message is used to enable the mobility management element to page the terminal device.

24 Claims, 5 Drawing Sheets

(51) Int. Cl.

| | |
|---|---|
| ***H04L 12/26*** | (2006.01) |
| ***H04W 88/16*** | (2009.01) |
| ***H04W 4/90*** | (2018.01) |

(56) References Cited

U.S. PATENT DOCUMENTS

| | | | | |
|---|---|---|---|---|
| 2010/0067434 | A1 | 3/2010 | Siu et al. | |
| 2010/0098023 | A1 | 4/2010 | Aghili et al. | |
| 2010/0208624 | A1* | 8/2010 | Vikberg | H04W 68/12 370/259 |
| 2010/0220680 | A1* | 9/2010 | Ramankutty | H04W 68/08 370/329 |
| 2011/0075675 | A1* | 3/2011 | Koodli | H04L 12/14 370/401 |
| 2011/0286465 | A1* | 11/2011 | Koodli | H04W 68/00 370/401 |
| 2011/0310804 | A1* | 12/2011 | Beygzadeh | H04W 68/00 370/328 |
| 2012/0069737 | A1* | 3/2012 | Vikberg | H04W 28/12 370/232 |
| 2012/0207063 | A1* | 8/2012 | Shaw | H04W 76/10 370/271 |
| 2013/0130688 | A1* | 5/2013 | Chin | H04W 36/0009 455/436 |

FOREIGN PATENT DOCUMENTS

| | | |
|---|---|---|
| CN | 101159989 | 4/2008 |
| CN | 101394340 | 3/2009 |
| CN | 101394340 A | 3/2009 |
| CN | 101394657 | 3/2009 |
| CN | 101394657 A | 3/2009 |
| CN | 101466147 A | 6/2009 |
| CN | 101478830 | 7/2009 |
| CN | 101478830 A | 7/2009 |
| CN | 101541081 A | 9/2009 |
| WO | WO 2008/156308 A2 | 12/2008 |

OTHER PUBLICATIONS

Notice of Allowance dated Jun. 2, 2014 in parent U.S. Appl. No. 13/729,274 (15 pages).

U.S. Appl. No. 13/729,274, filed Dec. 28, 2012, Zhu et al., Huawei Technologies Co., Ltd. Shenzhen, P.R. China.

Chinese Search Report dated Aug. 23, 2013 in related Chinese Patent Application No. 201080001657X (2 pages).

International Search Report dated Apr. 7, 2011, in corresponding International Application No. PCT/CN2010/074629 (6 pages).

European Search Report mailed May 3, 2013 in corresponding European Patent Application No. EP 10842864 (9 pages).

NTT Docomo: "*Adding Percentage IE in Overload Start for MME overload Control*", 3GPP Draft; S2-090319_MME_Overload, 3rd Generation Partnership Project (3GPP), Mobile Competence Centre; 650, Route des Lucioles; F-06921 Sophia-Antipolis Cedex; France, no. Phoenix, Jan. 7, 2009, Jan. 7, 2009, (Jan. 7, 2009), XP05332882 (2 pages).

Ericcson et al: "Paging for Priority Services"; 3GPP Draft; R2-103895 Paging for Priority Services, 3rd Generation Partnership Project (3GPP), Mobile Competence Centre; 650, Route des Lucioles; F-06921 Sophia-Antipolis Cedex; France, vol. RAN WG2, no. Stockholm, Sweden; Jun. 28, 2010, Jun. 22, 2010 (Jun. 22, 2010), XP050451283 (4 pages).

"*3rd Generation Partnership Project; Technical Specification Group Services and System Aspects Enhancements for Multimedia Priority Service* (*Release 10*)", 3GPP Standard; 3GPP TR 23.854, 3rd Generation Partnership Project (3GPP), Mobile Competence Centre; 650, Route des Lucioles; F-06921 Sophia-Antipolis Cedex; France, No. 4.0, Jul. 21, 2010 (Jul. 21, 2010), pp. 1-38, XP050442018 (38 pages).

"*3rd Generation Partnership Project; Technical Specification Group Services and System Aspects Enhancements for Multimedia Priority Service* (*Release 10*)", 3GPP Standard; TR 23.854, 3rd Generation Partnership Project (3GPP), Mobile Competence Centre; 650, Route des Lucioles; F-06921 Sophia-Antipolis Cedex; France, No. .3.1, Jun. 2010 (Jun. 3, 2010), pp. 1-30, XP050441500 (30 pages).

"*3rd Generation Partnership Project; Technical Specification Group Services and System Aspects; General Packet Radio Service* (*GPRS*) *enhancements for Evolved Universal Terrestrial Radio Access Network* (*E-UTRAN*) *access* (*Release 10*)"; 3GPP TS 23.401 V10.8.0, Jun. 2012, pp. 1-278.

Written Opinion of the International Searching Authority, dated Apr. 7, 2011, in corresponding International Application No. PCT/CN2010/074629 (5 pages).

Chinese Issued Patent No. 102972073 B on Mar. 12, 2014 in corresponding Chinese Patent Application No. 201080001657.X (1 Front Page).

3GPP TR 23.854 "*3rd Generation Partnership Project; Technical Specification Group Services and System Aspects Enhancements for Multimedia Priority Service* (*Release 10*)," May 2010, pp. 1-31.

Non-Final Office Action dated Jan. 28, 2014 in parent U.S. Appl. No. 13/729,274 (13 pages).

* cited by examiner

SERVICE IMPLEMENTATION METHOD, APPARATUS, AND SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is *a Reissue Application of U.S. patent application Ser. No. 14/474,744, filed on Sep. 2, 2014, now U.S. Pat. No. 9,661,606, which is* a continuation of U.S. application Ser. No. 13/729,274, filed on Dec. 28, 2012, *now U.S. Pat. No. 8,862,163,* which is a continuation of International Application No. PCT/CN2010/074629, filed on Jun. 28, 2010, [The afore-mentioned patents] *all of which* are hereby incorporated by reference in their entireties.

FIELD OF THE INVENTION

The present invention relates to the field of network communications technologies, and in particular to a service implementation method, apparatus, and system.

BACKGROUND OF THE INVENTION

When an emergent event or an urgent matter occurs, it is necessary to ensure that a part of population (such as government workers, firefighters, police, and medical staff) has the priority to use network resources. Even in the case of network congestion, it is also necessary to ensure that this part of the population is capable of properly using network resources.

For an emergent event or an urgent matter, a 3GPP network provides a solution such as the Enhanced Multimedia Priority Service (Enhanced Multimedia Priority Service, eMPS) to ensure that the part of users such as government workers, firefighters, or police who have the access priority is capable of properly using network resources in the case of network congestion. In the case of network congestion or the like, it is ensured that a user with an eMPS capability has the priority to use network resources. Certainly, in other network architecture, a solution for ensuring that the part of users with the access priority has the priority to use network resources may also be called another name, which is not limited herein.

An existing service implementation method cannot ensure that a user with an eMPS capability has the priority to use network resources. In an existing service implementation process, after receiving a downlink data packet of a User Equipment (user equipment, UE) sent by a Packet Data Network Gateway (packet data network gateway, P-GW), a Serving Gateway (serving gateway, S-GW) may trigger a mobility management element to page the UE, so as to deliver the downlink data packet to the UE. The mobility management element may be a Mobility Management Entity (mobility management entity, MME), a Serving GPRS Supporting Node (serving GPRS supporting node, SGSN), or the like.

To avoid that each downlink data packet of the UE received by the S-GW triggers the mobility management element to page the UE, which brings pressure on an air interface, the S-GW may generally adopt the technology of periodically triggering the MME to page the UE or not repeatedly triggering the MME to page the UE before the UE initiates a service request. However, in a practical service implementation process, a UE without an eMPS capability may be transformed to have the eMPS capability or a UE with a low-priority eMPS capability may be transformed to have a high-priority eMPS capability. In this case, if the S-GW has triggered, for a previously received downlink data packet of the UE, the MME to perform paging, the S-GW will trigger the MME to page the UE when the next timing interval arrives or will not trigger the MME to page the UE no matter whether a downlink data packet of the UE subsequently received by the S-GW is a downlink data packet of the UE with the lower-priority eMPS capability or a downlink data packet of the UE with the higher-priority eMPS capability. As a result, the existing service implementation method cannot ensure that a user with an eMPS capability has the priority to use network resources.

Similarly, after receiving the first paging trigger message of the UE, the mobility management element may page the UE through an access network element. After the mobility management element delivers a paging message to the access network element and before the mobility management element receives a paging response message of the UE, the mobility management element will not page the UE for the latter received paging trigger message if the mobility management element receives another paging trigger message of the UE. In this case, no matter whether the latter paging trigger message received by the mobility management element requires a preferential paging service, the mobility management element will not page the UE for the paging trigger message. As a result, the existing service implementation method cannot ensure that a user with an eMPS capability has the priority to use network resources.

SUMMARY OF THE INVENTION

A service implementation method, apparatus, and system provided in embodiments of the present invention are capable of ensuring that a user with an eMPS capability has the priority to use network resources while avoiding pressure brought to an air interface.

A service implementation method according to an embodiment of the present invention includes:

receiving, by a serving gateway, a data packet of a terminal device sent by a packet data network gateway; and if the data packet is a data packet with a serving priority and the serving gateway has sent a paging trigger message with a serving priority to a mobility management element, skipping, by the serving gateway, sending a paging trigger message to the mobility management element;

or if the data packet is a data packet with a serving priority and the serving gateway has sent no paging trigger message with a serving priority to a mobility management element, sending, by the serving gateway, a paging trigger message to the mobility management element;

where the paging trigger message is used to enable the mobility management element to page the terminal device.

Another service implementation method according to an embodiment of the present invention includes:

receiving, by a mobility management element, a paging trigger message of a terminal device sent by a serving gateway; and if the paging trigger message is a paging trigger message with a serving priority and the mobility management element has sent a paging message with a serving priority to an access network element, skipping, by the mobility management element, sending a paging message to the access network element; or if the paging trigger message is a paging trigger message with a serving priority and the mobility management element has sent no paging message with a serving priority to an access network element, sending, by the mobility management element, a paging message to the access network element.

A service implementation apparatus according to an embodiment of the present invention includes:

a first receiving module, configured to receive a data packet of a terminal device sent by a packet data network gateway; and a first control module, configured to skip sending a paging trigger message to a mobility management element if the data packet is a data packet with a serving priority and the service implementation apparatus has sent a paging trigger message with a serving priority to the mobility management element; or a first control module, configured to send a paging trigger message to a mobility management element if the data packet is a data packet with a serving priority and the service implementation apparatus has sent no paging trigger message with a serving priority to the mobility management element;

where the paging trigger message is used to enable the mobility management element to page the terminal device.

Another service implementation apparatus according to an embodiment of the present invention is a mobility management element and includes:

a second receiving module, configured to receive a paging trigger message of a terminal device sent by a serving gateway; and a second control module, configured to skip sending a paging message to an access network element if the paging trigger message is a paging trigger message with a serving priority and the service implementation apparatus has sent a paging message with a serving priority to the access network element; or a second control module, configured to send a paging message to an access network element if the paging trigger message is a paging trigger message with a serving priority and the service implementation apparatus has sent no paging message with a serving priority to the access network element.

A service implementation system according to an embodiment of the present invention includes a serving gateway and a mobility management element, where:

the serving gateway is configured to receive a data packet of a terminal device sent by a packet data network gateway and send a paging trigger message to the mobility management element; and the mobility management element is configured to receive the paging trigger message of the terminal device sent by the serving gateway, and if the paging trigger message is a paging trigger message with a serving priority and the mobility management element has sent a paging message with a serving priority to an access network element, skip sending a paging message to the access network element; or if the paging trigger message is a paging trigger message with a serving priority and the mobility management element has sent no paging message with a serving priority to an access network element, send a paging message to the access network element.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following descriptions merely show some embodiments of the present invention, and persons of ordinary skill in the art can derive other drawings from the accompanying drawings without creative efforts.

DETAILED DESCRIPTION OF THE EMBODIMENTS

The following embodiments describe the specific implementation process of the present invention with the help of examples. Obviously, the embodiments to be described below are only part of rather than all of the embodiments of the present invention. All other embodiments obtained by persons of ordinary skill in the art based on the embodiments of the present invention without creative efforts shall fall within the protection scope of the present invention.

Embodiment 1 provides a service implementation method. The method is described below with reference to FIG. 1.

Figure 1:
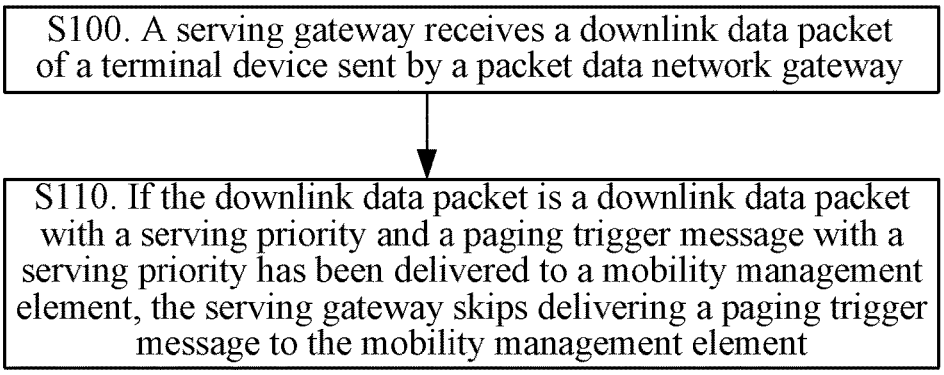
FIG. 1 is a flowchart of a service implementation method according to Embodiment 1 of the present invention.

As shown in FIG. 1: S100. A serving gateway receives a data packet of a terminal device sent by a packet data network gateway.

The data packet of the terminal device sent by the packet data network gateway and received by the serving gateway may also be named a downlink data packet. For ease of description, the name of downlink data packet is used in each of the following embodiments for description. The downlink data packet may be a user-plane data packet or control signaling. The control signaling may be, for example, a create bearer request, a create dedicated bearer request, or an update bearer request. Content specifically included in the downlink data packet, user-plane data packet, and control signaling of the terminal device is not limited in this embodiment.

S110. If the downlink data packet is a downlink data packet with a serving priority and the serving gateway has sent a paging trigger message with a serving priority to a mobility management element, the serving gateway skips delivering a paging trigger message to the mobility management element. The paging trigger message is used to enable the mobility management element to page the terminal device. The delivered paging trigger message with a serving priority is a paging trigger message delivered for the downlink data packet with a serving priority. In this embodiment of the present invention, delivering, by the serving gateway, the paging trigger message with a serving priority to the mobility management element is sending, by the serving gateway, the paging trigger message with a serving priority to the mobility management element. In this embodiment and other embodiments of the present invention, "delivering" mentioned in other places means sending.

S110 may be implemented by using "information about the sent paging trigger message with a serving priority". A specific example is as follows: If the serving gateway determines that the received downlink data packet is a downlink data packet with a serving priority and the serving gateway has recorded the "information about the sent paging trigger message with a serving priority", the serving gateway skips delivering a paging trigger message to the mobility management element. Each paging trigger message described above is used to enable the mobility management element to page the terminal device. The paging trigger message may specifically be a downlink data notification message or control signaling. For example, when the downlink data packet is a user-plane data packet, the paging trigger message may specifically be a downlink data notification message. For another example, when the downlink data packet is control signaling and the Idle Mode Signaling Reduction (idle mode signaling reduction, ISR) is activated, the paging trigger message may specifically be a downlink data notification message. For still another example, when the downlink data packet is control signaling and the ISR is not activated, the paging trigger message may specifically be control signaling. The specific name and specific included content of the paging trigger message are not limited in this embodiment.

In S110, there are multiple manners for the serving gateway to determine whether the received downlink data packet is a downlink data packet with a serving priority. For example, when the downlink data packet received by the serving gateway is a user-plane data packet, the serving gateway may determine whether the received downlink data packet is a downlink data packet with a serving priority according to the allocation and retention priority (ARP) in the bearer quality of service (QoS) of the user-plane data packet. For another example, when the downlink data packet received by the serving gateway is control signaling, the serving gateway may determine whether the control signaling is a downlink data packet with a serving priority according to a QoS parameter in the control signaling. The specific implementation manner for the serving gateway to determine whether the received downlink data packet is a downlink data packet with a serving priority is not limited in this embodiment.

The "information about the sent paging trigger message with a serving priority" in S110 may be a "flag bit of sent downlink data with a serving priority", "information about a priority with a serving priority", or a "flag bit of sent downlink data with a serving priority" and "information about a priority with a serving priority". Certainly, the "information about the sent paging trigger message with a serving priority" may also adopt another setting manner. The specific presentation form of the "information about the sent paging trigger message with a serving priority" is not limited in this embodiment.

The "flag bit of sent downlink data with a serving priority" may be a 1-bit FLAG. For example, when no FLAG is set or a set FLAG is 0, it indicates that no downlink data with a serving priority has been sent; when a FLAG is set or a set FLAG is 1, it indicates that downlink data with a serving priority has been sent.

When the "information about the sent paging trigger message with a serving priority" is a "flag bit of sent downlink data with a serving priority", an example of a specific implementation process of S110 is as follows: The serving gateway determines whether the received downlink data packet is a downlink data packet with a serving priority and whether the "flag bit of sent downlink data with a serving priority" is set. If the received downlink data packet is a downlink data packet with a serving priority and the "flag bit of sent downlink data with a serving priority" is set, the serving gateway skips delivering a paging trigger message to the mobility management element for the received downlink data packet with a serving priority.

The example of the specific implementation process of S110 may also be described as follows: If the downlink data packet with a serving priority of the terminal device received by the serving gateway is not the first received downlink data packet with a serving priority, the serving gateway skips delivering a paging trigger message to the mobility management element.

When the "information about the sent paging trigger message with a serving priority" is "information about a priority with a serving priority", an example of a specific implementation process of S110 is as follows: The serving gateway determines whether the received downlink data packet is a downlink data packet with a serving priority and whether the "information about a priority with a serving priority" is set. If the received downlink data packet is a downlink data packet with a serving priority and the "information about a priority with a serving priority" is set, the serving gateway determines whether the priority of the downlink data packet is higher than the priority indicated by the set "information about a priority with a serving priority". If the priority of the downlink data packet is not higher than the priority indicated by the set "information about a priority with a serving priority", the serving gateway skips delivering a paging trigger message to the mobility management element for the received downlink data packet with a serving priority.

When the "information about the sent paging trigger message with a serving priority" is a "flag bit of sent downlink data with a serving priority" and "information about a priority with a serving priority", an example of a specific implementation process of S110 is as follows: The serving gateway determines whether the received downlink data packet is a downlink data packet with a serving priority and whether the "flag bit of sent downlink data with a serving priority" is set. If the received downlink data packet is a downlink data packet with a serving priority and the "flag bit of sent downlink data with a serving priority" is set, the serving gateway determines whether the priority of the downlink data packet is higher than the priority indicated by the set "information about a priority with a serving priority". If the priority of the downlink data packet is not higher than the priority indicated by the set "information about a priority with a serving priority", the serving gateway skips delivering a paging trigger message to the mobility management element for the received downlink data packet with a serving priority. If the serving gateway determines that the received downlink data packet is not a downlink data packet with a serving priority, the serving gateway may adopt an existing processing manner to perform paging trigger control.

As can be seen from the description in Embodiment 1, after receiving a downlink data packet, the serving gateway in Embodiment 1 may determine whether to skip delivering a paging trigger message to the mobility management element by determining whether the downlink data packet is a downlink data packet with a serving priority and whether a paging trigger message with a serving priority has been delivered to the mobility management element. In this case, a paging trigger message is delivered to the mobility management element only when the downlink data packet is a downlink data packet with a serving priority and no paging trigger message with a serving priority has been delivered to the mobility management element. In this way, even when the serving gateway has been in the state of being forbidden to deliver a paging trigger message to the mobility management element to relieve pressure on an air interface, the serving gateway is still capable of delivering a paging trigger message to the mobility management element for a downlink data packet with a serving priority. The serving gateway delivers a paging trigger message to the mobility management element for a downlink data packet with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 2 provides a service implementation method. The method is described below with reference to FIG. 2.

Figure 2:
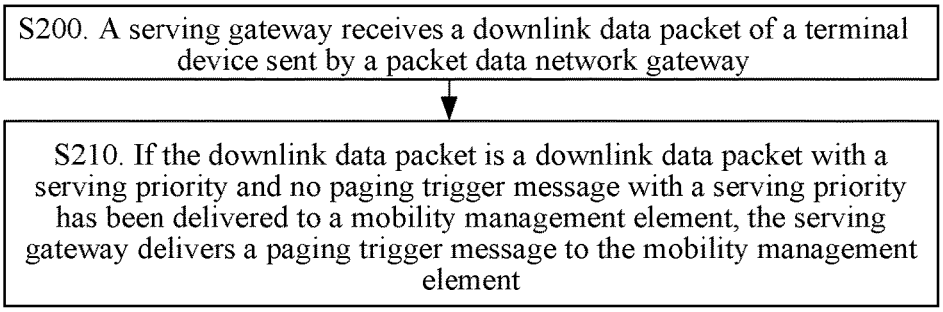
FIG. 2 is a flowchart of a service implementation method according to Embodiment 2 of the present invention.

As shown in FIG. 2: S200. A serving gateway receives a downlink data packet of a terminal device sent by a packet data network gateway.

The downlink data packet received by the serving gateway may be a user-plane data packet or control signaling. The control signaling may be, for example, a create bearer request, a create dedicated bearer request, or an update bearer request. Content specifically included in the downlink data packet, user-plane data packet, and control signaling of the terminal device is not limited in this embodiment.

S210. If the downlink data packet is a downlink data packet with a serving priority and the serving gateway has delivered no paging trigger message with a serving priority to a mobility management element, the serving gateway delivers a paging trigger message to the mobility management element. The paging trigger message is used to enable the mobility management element to page the terminal device.

Further, after sending the paging trigger message with a serving priority to the mobility management element, the serving gateway records "information about the sent paging trigger message with a serving priority".

A specific example of S210 is as follows: If the serving gateway determines that the received downlink data packet is a downlink data packet with a serving priority and the serving gateway does not record the "information about the sent paging trigger message with a serving priority", the serving gateway delivers a paging trigger message to the mobility management element and records the "information about the sent paging trigger message with a serving priority". The paging trigger message delivered by the serving gateway to the mobility management entity may specifically be a downlink data notification message or control signaling. For example, when the downlink data packet is a user-plane data packet, the paging trigger message may specifically be a downlink data notification message. For another example, when the downlink data packet is control signaling and the ISR is activated, the paging trigger message may specifically be a downlink data notification message. For still another example, when the downlink data packet is control signaling and the ISR is not activated, the paging trigger message may specifically be control signaling. The specific name and specific included content of the paging trigger message are not limited in this embodiment.

In S210, there are multiple manners for the serving gateway to determine whether the received downlink data packet is a downlink data packet with a serving priority. For example, when the downlink data packet received by the serving gateway is a user-plane data packet, the serving gateway may determine whether the received downlink data packet is a downlink data packet with a serving priority according to the allocation and retention priority (ARP) in the bearer quality of service (QoS) of the user-plane data packet. For another example, when the downlink data packet received by the serving gateway is control signaling, the serving gateway may determine whether the control signaling is a downlink data packet with a serving priority according to a QoS parameter in the control signaling. The specific implementation manner for the serving gateway to determine whether the received downlink data packet is a downlink data packet with a serving priority is not limited in this embodiment.

The "information about the sent paging trigger message with a serving priority" in S210 may be a "flag bit of sent downlink data with a serving priority", "information about a priority with a serving priority", or a "flag bit of sent downlink data with a serving priority" and "information about a priority with a serving priority". Certainly, the "information about the sent paging trigger message with a serving priority" may also adopt another setting manner. The specific presentation form of the "information about the sent paging trigger message with a serving priority" is not limited in this embodiment.

The "flag bit of sent downlink data with a serving priority" may be a 1-bit FLAG. For example, when no FLAG is set or a set FLAG is 0, it indicates that no downlink data with a serving priority has been sent; when a FLAG is set or a set FLAG is 1, it indicates that downlink data with a serving priority has been sent.

When the "information about the sent paging trigger message with a serving priority" is a "flag bit of sent downlink data with a serving priority", an example of a specific implementation process of S210 is as follows: The serving gateway determines whether the received downlink data packet is a downlink data packet with a serving priority and whether the "flag bit of sent downlink data with a serving priority" is set. If the received downlink data packet is a downlink data packet with a serving priority and the "flag bit of sent downlink data with a serving priority" is not set, the serving gateway delivers a paging trigger message to the mobility management element and sets the "flag bit of sent downlink data with a serving priority".

The example of the specific implementation process of S210 may also be described as follows: If the serving gateway receives a downlink data packet with a serving priority of the terminal device for the first time, the serving gateway delivers a paging trigger message to the mobility management element and records the "flag bit of sent downlink data with a serving priority".

When the "information about the sent paging trigger message with a serving priority" is "information about a priority with a serving priority", an example of a specific implementation process of S210 is as follows: The serving gateway determines whether the received downlink data packet is a downlink data packet with a serving priority and whether the "information about a priority with a serving priority" is set. If the received downlink data packet is a downlink data packet with a serving priority and the "information about a priority with a serving priority" is set, the serving gateway determines whether the priority of the downlink data packet is higher than the priority indicated by the set "information about a priority with a serving priority". If the priority of the downlink data packet is higher than the priority indicated by the set "information about a priority with a serving priority", the serving gateway delivers a paging trigger message to the mobility management element for the received downlink data packet with a serving priority and sets the "information about a priority with a serving priority" according to the priority of the downlink data packet. If the received downlink data packet is a downlink data packet with a serving priority and the "information about a priority with a serving priority" is not set, the serving gateway delivers a paging trigger message to the mobility management element for the received downlink data packet with a serving priority and sets the "information about a priority with a serving priority" according to the priority of the downlink data packet.

When the "information about the sent paging trigger message with a serving priority" is a "flag bit of sent downlink data with a serving priority" and "information about a priority with a serving priority", an example of a specific implementation process of S210 is as follows: The serving gateway determines whether the received downlink data packet is a downlink data packet with a serving priority and whether the "flag bit of sent downlink data with a serving priority" is set. If the received downlink data packet is a downlink data packet with a serving priority and the "flag bit of sent downlink data with a serving priority" is not set, the serving gateway delivers a paging trigger message to the mobility management element for the received downlink data packet with a serving priority, sets the "flag bit of sent downlink data with a serving priority", and sets the "information about a priority with a serving priority" according to the priority of the downlink data packet. If the received downlink data packet is a downlink data packet with a serving priority and the "flag bit of sent downlink data with a serving priority" is set, the serving gateway determines whether the priority of the downlink data packet is higher than the priority indicated by the set "information about a priority with a serving priority". If the priority of the downlink data packet is higher than the priority indicated by the set "information about a priority with a serving priority", the serving gateway delivers a paging trigger message to the mobility management element for the received downlink data packet with a serving priority and sets the "information about a priority with a serving priority" according to the priority of the downlink data packet.

In this embodiment, the paging trigger message delivered by the serving gateway to the mobility management element may include information about a serving priority, where the information about a serving priority may enable the mobility management element to preferentially page the terminal device. The information about a serving priority in the paging trigger message may include: a flag bit with a serving priority and/or information about a priority with a serving priority. The content specifically included in the information about a serving priority in the paging trigger message is not limited in this embodiment.

The mobility management element in this embodiment may include an MME and/or an SGSN. For example, in an application scenario in which the ISR is not activated, the serving gateway may deliver a paging trigger message to the MME or the SGSN according to an access technology adopted by the terminal device, whereas in an application scenario in which the ISR is activated, the serving gateway may deliver a paging trigger message to the MME and the SGSN each.

As can be seen from the description in Embodiment 2, after receiving a downlink data packet, the serving gateway in Embodiment 2 may determine whether it is necessary to deliver a paging trigger message again to the mobility management element by determining whether the downlink data packet is a downlink data packet with a serving priority and whether a paging trigger message has been delivered to the mobility management element for the downlink data packet. In this way, even when the serving gateway has been in the state of being forbidden to deliver a paging trigger message to the mobility management element to relieve pressure on an air interface, the serving gateway is still capable of delivering a paging trigger message to the mobility management element for a downlink data packet with a serving priority. The serving gateway delivers a paging trigger message to the mobility management element for a downlink data packet with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 3 provides a service implementation method. The method is described below with reference to FIG. 3.

Figure 3:
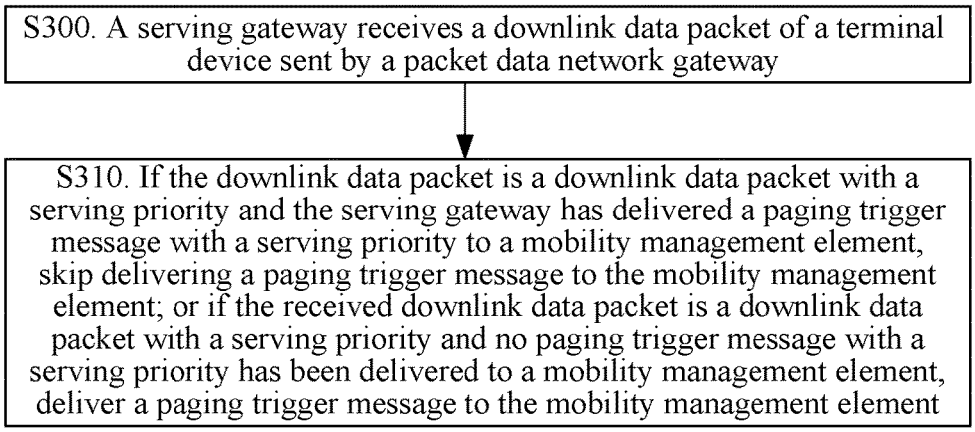
FIG. 3 is a flowchart of a service implementation method according to Embodiment 3 of the present invention.

As shown in FIG. 3: S300. A serving gateway receives a downlink data packet of a terminal device sent by a packet data network gateway.

S310. If the downlink data packet is a downlink data packet with a serving priority and the serving gateway has delivered a paging trigger message with a serving priority to a mobility management element, the serving gateway skips delivering a paging trigger message to the mobility management element; or if the serving gateway determines that the received downlink data packet is a downlink data packet with a serving priority and the serving gateway has delivered no paging trigger message with a serving priority to a mobility management element, the serving gateway delivers a paging trigger message to the mobility management element.

Further, after sending the paging trigger message with a serving priority to the mobility management element, the serving gateway records "information about the sent paging trigger message with a serving priority". The paging trigger message is specifically as described in the foregoing embodiments and is not repeatedly described herein.

In S310, there are multiple manners for the serving gateway to determine whether the received downlink data packet is a downlink data packet with a serving priority, as described in the foregoing embodiments. Details are not repeated herein.

In S310, the "information about the sent paging trigger message with a serving priority" is specifically as described in the foregoing embodiments and is not repeatedly described herein.

When the "information about the sent paging trigger message with a serving priority" is a "flag bit of sent downlink data with a serving priority", an example of a specific implementation process of S310 is as described in the foregoing embodiments and is not repeatedly described herein.

When the "information about the sent paging trigger message with a serving priority" is "information about a priority with a serving priority", an example of a specific implementation process of S310 is as described in the foregoing embodiment and is not repeatedly described herein. When the "information about the sent paging trigger message with a serving priority" is a "flag bit of sent downlink data with a serving priority" and "information about the sent paging trigger message with a serving priority", an example of a specific implementation process of S310 is as described in the foregoing embodiments and is not repeatedly described herein.

In this embodiment, the paging trigger message delivered by the serving gateway to the mobility management element may include information about a serving priority, where the information about a serving priority may enable the mobility management element to preferentially page the terminal device. The information about a serving priority in the paging trigger message may include: a flag bit with a serving priority and/or information about a priority with a serving priority. The content specifically included in the information about a serving priority in the paging trigger message is not limited in this embodiment.

The mobility management element in this embodiment may include an MME and/or an SGSN. For example, in an application scenario in which the ISR is not activated, the serving gateway may deliver a paging trigger message to the MME or the SGSN according to an access technology adopted by the terminal device, whereas in an application scenario in which the ISR is activated, the serving gateway may deliver a paging trigger message to the MME and the SGSN each.

As can be seen from the description in Embodiment 3, after receiving a downlink data packet, the serving gateway in Embodiment 1 may determine whether it is necessary to deliver a paging trigger message again to the mobility management element by determining whether the downlink data packet is a downlink data packet with a serving priority and whether a paging trigger message has been delivered to the mobility management element for the downlink data packet. In this way, even when the serving gateway has been in the state of being forbidden to deliver a paging trigger message to the mobility management element to relieve pressure on an air interface, the serving gateway is still capable of delivering a paging trigger message to the mobility management element for a downlink data packet with a serving priority. The serving gateway delivers a paging trigger message to the mobility management element for a downlink data packet with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 4 provides a service implementation method. The method is described below with reference to FIG. 4.

Figure 4:
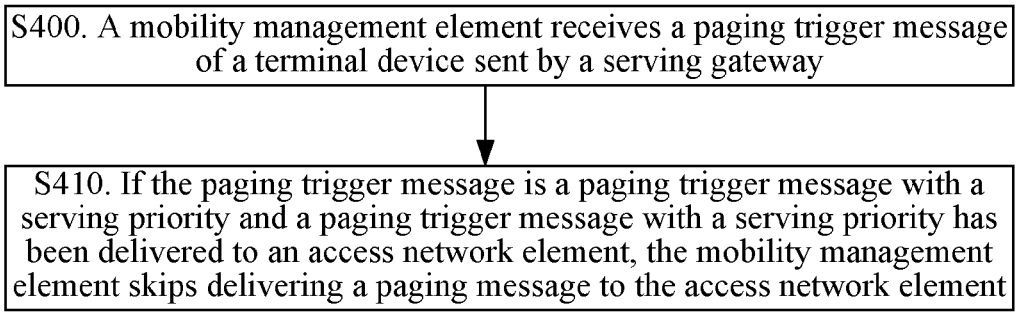
FIG. 4 is a flowchart of a service implementation method according to Embodiment 4 of the present invention.

As shown in FIG. 4: S400. A mobility management element receives a paging trigger message of a terminal device sent by a serving gateway. The mobility management element in this embodiment may be an MME or an SGSN.

S410. If the paging trigger message is a paging trigger message with a serving priority and the mobility management element has delivered a paging message with a serving priority to an access network element, the mobility management element skips delivering a paging message to the access network element.

The access network element may be, for example, a base station (NodeB) or an evolved base station (eNodeB).

S410 may be implemented by using "information about the sent paging message with a serving priority". A specific example is as follows: If the mobility management element determines that the received paging trigger message is a paging trigger message with a priority service with a serving priority and the mobility management element has recorded the "information about the sent paging message with a serving priority", the mobility management element skips delivering a paging message to the access network element. The specific name and specific included content of the paging message are not limited in this embodiment.

In S410, there are multiple manners for the mobility management element to determine whether the received paging trigger message is a paging trigger message with a serving priority. For example, the mobility management element determines whether the paging trigger message carries information about a serving priority. If the information about a serving priority is carried, it is determined that the paging trigger message is a paging trigger message with a serving priority. Otherwise, it is determined that the paging trigger message is not a paging trigger message with a serving priority. The specific implementation manner for the mobility management element to determine whether the received paging trigger message is a paging trigger message with a serving priority is not limited in this embodiment.

The "information about the sent paging message with a serving priority" in S410 may be a "flag bit of the sent paging message with a serving priority", "information about a priority with a serving priority", or a "flag bit of the sent paging message with a serving priority" and "information about a priority with a serving priority". Certainly, the "information about the sent paging message with a serving priority" may also adopt another setting manner. The specific presentation form of the "information about the sent paging message with a serving priority" is not limited in this embodiment.

The "flag bit of the sent paging message with a serving priority" may be a 1-bit FLAG. For example, when no FLAG is set or a set FLAG is 0, it indicates that no paging message with a serving priority has been sent; when a FLAG is set or a set FLAG is 1, it indicates that a paging message with a serving priority has been sent.

When the "information about the sent paging message with a serving priority" is a "flag bit of the sent paging message with a serving priority", an example of a specific implementation process of S410 is as follows: The mobility management element determines whether the received paging trigger message is a paging trigger message with a serving priority and whether the "flag bit of the sent paging message with a serving priority" is set. If the received paging trigger message is a paging trigger message with a serving priority and the "flag bit of the sent paging message with a serving priority" is set, the mobility management element skips delivering a paging message to the access network element for the received paging trigger message with a serving priority. If the mobility management element determines that the received paging trigger message is not a paging trigger message with a serving priority, the mobility management element may adopt an existing processing manner to perform paging control.

The example of the specific implementation process of S410 may also be described as follows: If the paging trigger message with a serving priority of the terminal device received by the mobility management element is not the first received paging trigger message with a serving priority, the mobility management element skips delivering a paging message to the access network element.

When the "information about the sent paging trigger message with a serving priority" is "information about a priority with a serving priority", an example of a specific implementation process of S410 is as follows: The mobility management element determines whether the received paging trigger message is a paging trigger message with a serving priority and whether the "information about a priority with a serving priority" is set. If the received paging trigger message is a paging trigger message with a serving priority and the "information about a priority with a serving priority" is set, the mobility management element determines whether the priority of the paging trigger message is higher than the priority indicated by the set "information about a priority with a serving priority". If the priority of the paging trigger message is not higher than the priority indicated by the set "information about a priority with a serving priority", the mobility management element skips delivering a paging message to the access network element for the received paging trigger message with a serving priority. If the mobility management element determines that the received paging trigger message is not a paging trigger message with a serving priority, the mobility management element may adopt an existing processing manner to perform paging control.

When the "information about the sent paging trigger message with a serving priority" is a "flag bit of the sent paging message with a serving priority" and "information about a priority with a serving priority", an example of a specific implementation process of S410 is as follows: The mobility management element determines whether the received paging trigger message is a paging trigger message with a serving priority and whether the "flag bit of the sent paging message with a serving priority" is set. If the received paging trigger message is a paging trigger message with a serving priority and the "flag bit of the sent paging message with a serving priority" is set, the mobility management element determines whether the priority of the paging trigger message is higher than the priority indicated by the set "information about a priority with a serving priority". If the priority of the paging trigger message is not higher than the priority indicated by the set "information about a priority with a serving priority", the mobility management element skips delivering a paging message to the access network element for the received paging trigger message with a serving priority. If the mobility management element determines that the received paging trigger message is not a paging trigger message with a serving priority, the mobility management element may adopt an existing processing manner to perform paging control.

In S410, if the paging trigger message is a paging trigger message with a serving priority and the mobility management element has delivered no paging message with a serving priority to the access network element, the mobility management element delivers a paging message to the access network element. Further, after delivering the paging message to the access network element, the mobility management element records the "information about the sent paging message with a serving priority".

As can been seen from the description in Embodiment 4, after receiving a paging trigger message, the mobility management element in Embodiment 4 may determine whether to skip delivering a paging message to the access network element by determining whether the paging trigger message is a paging trigger message with a serving priority and whether a paging trigger message with a serving priority has been delivered to the access network element. In this case, a paging message is delivered to the access network element only when the paging trigger message is a paging trigger message with a serving priority and no paging trigger message with a serving priority has been delivered to the access network element. In this way, even when the mobility management element has been in the state of being forbidden to deliver a paging message to the access network element to relieve pressure on an air interface, the mobility management element is still capable of delivering a paging message to the access network element for a paging trigger message with a serving priority. The mobility management element delivers a paging message to the access network element for a paging trigger message with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 5 provides a service implementation method. This embodiment is described in detail below with reference to FIG. 5.

Figure 5:
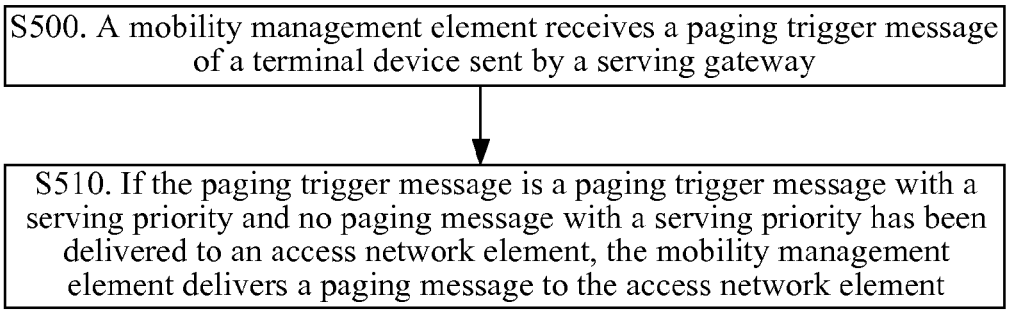
FIG. 5 is a flowchart of a service implementation method according to Embodiment 5 of the present invention.

As shown in FIG. 5: S500. A mobility management element receives a paging trigger message of a terminal device sent by a serving gateway. The mobility management element in this embodiment may be an MME or an SGSN.

S510. If the paging trigger message is a paging trigger message with a serving priority and no paging message with a serving priority has been delivered to an access network element, the mobility management element delivers a paging message to the access network element.

Further, after sending the paging message with a serving priority to the access network element, the mobility management element records "information about the sent paging message with a serving priority".

A specific example of S510 is as follows: If the mobility management element determines that the received paging trigger message is a paging trigger message with a serving priority and the mobility management element does not record the "information about the sent paging message with a serving priority", the mobility management element delivers a paging message to the access network element and records the "information about the sent paging message with a serving priority". The specific name and specific included content of the paging trigger message are not limited in this embodiment.

In S510, there are multiple manners for the mobility management element to determine whether the received paging trigger message is a paging trigger message with a serving priority. For example, the mobility management element determines whether the paging trigger message carries information about a serving priority. If the information about a serving priority is carried, it is determined that the paging trigger message is a paging trigger message with a serving priority. Otherwise, it is determined that the paging trigger message is not a paging trigger message with a serving priority. The specific implementation manner for the mobility management element to determine whether the received paging trigger message is a paging trigger message with a serving priority is not limited in this embodiment.

The "information about the sent paging message with a serving priority" in S510 may be a "flag bit of the sent paging message with a serving priority", "information about a priority with a serving priority", or a "flag bit of the sent paging message with a serving priority" and "information about a priority with a serving priority". Certainly, the "information about the sent paging message with a serving priority" may also adopt another setting manner. The specific presentation form of the "information about the sent paging message with a serving priority" is not limited in this embodiment.

The "flag bit of the sent paging message with a serving priority" may be a 1-bit FLAG. For example, when no FLAG is set or a set FLAG is 0, it indicates that no paging message with a serving priority has been sent; when a FLAG is set or a set FLAG is 1, it indicates that a paging message with a serving priority has been sent.

When the "information about the sent paging message with a serving priority" is a "flag bit of the sent paging message with a serving priority", an example of a specific implementation process of S510 is as follows: The mobility management element determines whether the received paging trigger message is a paging trigger message with a serving priority and whether the "flag bit of the sent paging message with a serving priority" is set. If the received paging trigger message is a paging trigger message with a serving priority and the "flag bit of the sent paging message with a serving priority" is not set, the mobility management element delivers a paging message to the access network element and sets the "flag bit of the sent paging message with a serving priority". If the mobility management element determines that the received paging trigger message is not a paging trigger message with a serving priority, the mobility management element may adopt an existing processing manner to perform paging control.

The example of the specific implementation process of S510 may also be described as follows: If the mobility management element receives a paging trigger message with a serving priority of the terminal device for the first time, the mobility management element delivers a paging message to the access network element and records the "flag bit of the sent paging message with a serving priority".

When the "information about the sent paging message with a serving priority" is "information about a priority with a serving priority", an example of a specific implementation process of S510 is as follows: The mobility management element determines whether the received paging trigger message is a paging trigger message with a serving priority and whether the "information about a priority of a serving priority" is set. If the received paging trigger message is a paging trigger message with a serving priority and the "information about a priority of a serving priority" is set, the mobility management element determines whether the priority of the paging trigger message is higher than the priority indicated by the set "information about a priority of a serving priority". If the priority of the paging trigger message is higher than the priority indicated by the set "information about a priority of a serving priority", the mobility management element delivers a paging message for the received paging trigger message with a serving priority and sets the "information about a priority of a serving priority" according to the priority of the paging trigger message. If the received paging trigger message is a paging trigger message with a serving priority and the "information about a priority of a serving priority" is not set, the mobility management element delivers a paging message to the access network element for the received paging trigger message with a serving priority and sets the "information about a priority of a serving priority" according to the priority of the paging trigger message. If the mobility management element determines that the received paging trigger message is not a paging trigger message with a serving priority, the mobility management element may adopt an existing processing manner to perform paging control.

When the "information about the sent paging message with a serving priority" is a "flag bit of the sent paging message with a serving priority" and "information about a priority of a serving priority", an example of a specific implementation process of S510 is as follows: The mobility management element determines whether the received paging trigger message is a paging trigger message with a serving priority and whether the "flag bit of the sent paging message with a serving priority" is set. If the received paging trigger message is a paging trigger message with a serving priority and the "flag bit of the sent paging message with a serving priority" is not set, the mobility management element delivers a paging message to the access network element for the received paging trigger message with a serving priority, sets the "flag bit of the sent paging message with a serving priority", and sets the "information about a priority of a serving priority" according to the priority of the paging trigger message. If the received paging trigger message is a paging trigger message with a serving priority and the "flag bit of the sent paging message with a serving priority" is set, the mobility management element determines whether the priority of the paging trigger message is higher than the priority indicated by the set "information about a priority of a serving priority". If the priority of the paging trigger message is higher than the priority indicated by the set "information about a priority of a serving priority", the mobility management element delivers a paging message for the received paging trigger message with a serving priority and sets the "information about a priority of a serving priority" according to the priority of the paging trigger message. If the mobility management element determines that the received paging trigger message is not a paging trigger message with a serving priority, the mobility management element may adopt an existing processing manner to perform paging control.

In this embodiment, the paging message delivered by the mobility management element may include information about a serving priority, where the information about a serving priority may enable an access device such as a base station to preferentially page the terminal device. The information about a serving priority in the paging message may include: a flag bit of a serving priority and/or information about a priority of a serving priority. The content specifically included in the information about a serving priority in the paging message is not limited in this embodiment.

As can been seen from the description in Embodiment 5, after receiving a paging trigger message, the mobility management element in Embodiment 5 may determine whether it is necessary to deliver a paging message again to the access network element by determining whether the paging trigger message is a paging trigger message with a serving priority and whether a paging message with a serving priority has been delivered to the access network element. In this way, even when the mobility management element has been in the state of being forbidden to deliver a paging message to the access network element to relieve pressure on an air interface, the mobility management element is still capable of delivering a paging message to the access network element for a paging trigger message with a serving priority. The mobility management element delivers a paging message to the access network element for a paging trigger message with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 6 provides a service implementation method when the ISR is not activated. The process of the method is shown in FIG. 6.

Figure 6:
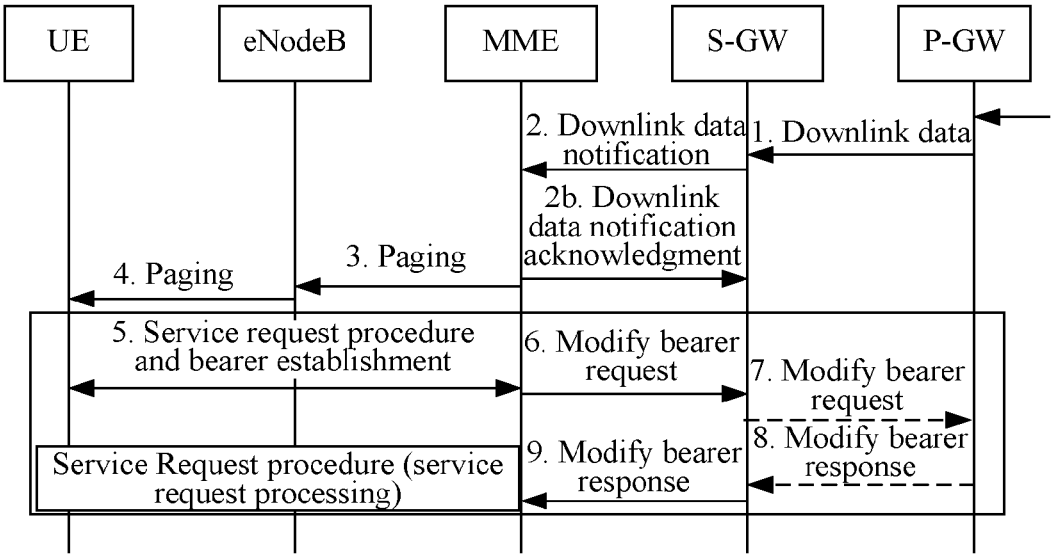
FIG. 6 is a flowchart of a service implementation method according to Embodiment 6 of the present invention.

As shown in FIG. 6: S1. A P-GW sends a downlink data packet to an S-GW, where the downlink data packet may be a user-plane data packet or control signaling.

S2. The S-GW determines that the downlink data packet is a downlink data packet with a serving priority and that no downlink data notification has been sent for a downlink data packet with a serving priority. Therefore, the S-GW sends a paging trigger message such as a downlink data notification message or control signaling to an MME. The S-GW records "information about the sent paging trigger message with a serving priority". For example, the S-GW records at least one of: a "flag bit of sent downlink data with a serving priority" and "information about a priority of a serving priority".

The "information about the sent paging trigger message with a serving priority" recorded by the S-GW is used for the S-GW to determine, after receiving a downlink data packet the next time, whether a downlink data notification message has been sent for a downlink data packet with a serving priority. For example, if the S-GW receives another downlink data packet with a serving priority of a UE, the S-GW may determine, according to the recorded information, to skip sending a downlink data notification message to the MME. For another example, if the S-GW receives another downlink data packet with a serving priority of the UE, the S-GW may perform comparison of priorities of serving priorities according to recorded information. If the priority of the received downlink data packet of the UE with a serving priority is higher than the priority of a serving priority in the recorded information, the S-GW sends a downlink data notification message to the MME. Otherwise, the S-GW skips sending a downlink data notification message to the MME.

It should be noted that when the S-GW determines that the downlink data packet is a downlink data packet with a serving priority and that no downlink data notification message has been sent for a downlink data packet with a serving priority and even when a delay timer in the S-GW is still operating, the S-GW will ignore the operating of the timer and send a downlink data notification message to the MME.

Alternatively, the paging trigger message delivered by the S-GW to the MME in S2 may include information about a serving priority, for example, the downlink data notification message includes a Priority Indication (that is, the serving-priority flag bit in the foregoing embodiments) and/or information about a priority of a serving priority (which may also be named information about a level of a serving priority). The information about a serving priority in the downlink data notification message may enable the MME to preferentially perform paging processing for the downlink data notification. For example, when MME resources are limited, paging processing is still performed for the downlink data notification message. The specific presentation form of the information about a serving priority is not limited in this embodiment.

In this embodiment, it is set that the downlink data packet received by the S-GW in S2 is a user-plane data packet. In this case, the S-GW may determine a bearer corresponding to the user-plane data packet and determine whether the downlink data packet is a downlink data packet with a serving priority according to bearer information (such as QoS of the bearer) of the bearer, where the bearer information is stored by the S-GW. For example, the S-GW may determine whether the downlink data packet is a downlink data packet with a serving priority according to the ARP parameter or the like in the QOS of the bearer.

If the downlink data packet received by the S-GW in S2 is replaced with control signaling (such as an Update Bearer Request (update bearer request)), the S-GW may determine whether the downlink data packet is a downlink data packet with a serving priority according to bearer information (such as QOS of the bearer) included in the control signaling. A specific example is as follows: The S-GW determines whether the control signaling is signaling for improving the priority of the UE bearer according to a QOS parameter in a Bearer context (bearer context) information element in the update bearer request. If yes, the S-GW determines that the update bearer request is control signaling with a serving priority. Otherwise, the S-GW determines that the update bearer request is not control signaling with a serving priority.

S2b. After receiving the downlink data notification, the MME returns a Downlink Data Notification Ack (downlink data notification acknowledgment) message to the S-GW. Alternatively, if the downlink data notification message received by the MME includes the information about a serving priority, the downlink data notification acknowledgment message returned by the MME may also include the information about a serving priority. For example, the downlink data notification acknowledgment message includes at least one of: the Priority Indication and the information about the priority of a serving priority.

If in S2, the S-GW sends a paging trigger message to the MME but the S-GW does not perform the operation of recording the "information about the sent paging trigger message with a serving priority", the S-GW may perform the operation of recording the "information about the sent paging trigger message with a serving priority" after receiving the downlink data notification acknowledgment message returned by the MME.

S3. After receiving the downlink data notification message, the MME sends a paging message to an eNodeB. Specifically, after receiving a downlink data notification message for the first time, the MME sends a paging message to the eNodeB. After receiving a downlink data notification message again and determining that the downlink data notification message carries the information about a serving priority, the MME sends a paging message again to the eNodeB and records the information about a serving priority. Alternatively, if the downlink data notification message received by the MME includes the information about a serving priority, the MME may preferentially send a paging message to the eNodeB. In addition, the paging message sent by the MME to the eNodeB may include the information about a serving priority.

S4. After receiving the paging message, the eNodeB sends a paging message to the UE, so as to page the UE.

S5. After receiving the paging message, the UE initiates a service request procedure and establishes an air interface and a bearer of an S1 connection.

S6. The MME sends a Modify Bearer Request (modify bearer request) message to the S-GW and notifies the address of the bearer of the UE in the eNodeB to the S-GW. Alternatively, the modify bearer request message sent by the MME to the S-GW includes the information about a serving priority.

Alternatively, this embodiment may include S7 and S8.

S7. The S-GW sends a modify bearer request message to the P-GW.

S8. The P-GW returns a modify bearer response message to the S-GW.

S9. The S-GW sends a modify bearer response message to the MME.

S5 to S9 are a service request processing procedure. In this embodiment, subsequent steps of service implementation are omitted.

In Embodiment 6, after receiving the downlink data packet, the S-GW may not determine whether to deliver a paging trigger message and instead directly delivers a paging trigger message to the MME according to the received downlink data packet.

As can be seen from the description in Embodiment 6, after receiving a downlink data packet, the S-GW in Embodiment 6 may determine whether it is necessary to deliver a paging trigger message again to the MME by determining whether the downlink data packet is a downlink data packet with a serving priority and whether a paging trigger message has been delivered to the MME for the downlink data packet. In this way, even when the S-GW has been in the state of being forbidden to deliver a paging trigger message to the MME to relieve pressure on an air interface, the S-GW is still capable of delivering a paging trigger message to the MME for a downlink data packet with a serving priority. A paging trigger message is delivered to the MME for a downlink data packet with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 7 provides a service implementation method when the ISR is activated. The process of the method is shown in FIG. 7A.

A common downlink data packet (not a downlink data packet with a serving priority) may arrive at an S-GW before a downlink data packet with a serving priority. A specific example is shown in FIG. 7A.

Figure 7A:
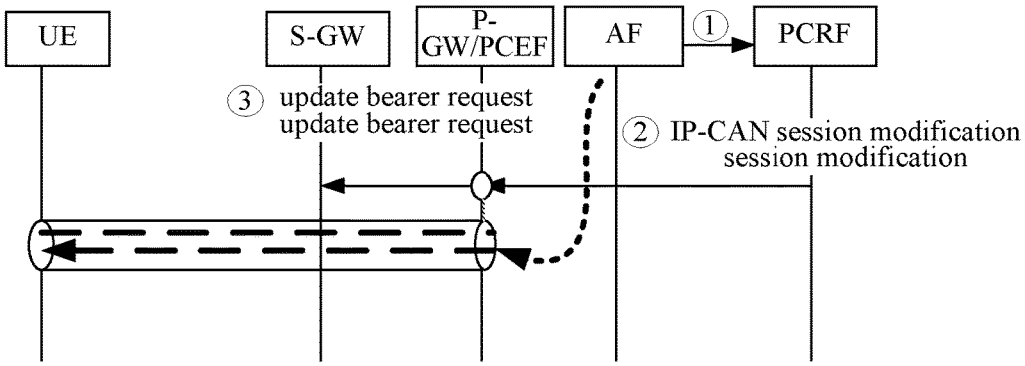
FIG. 7A is a schematic diagram of an application scenario according to Embodiment 7 of the present invention.

In FIG. 7A, after an UE accesses a network, the network provides a bearer for the UE, thereby providing a transmission service for a user-plane data packet of the UE.

As shown in FIG. 7A: S1. After receiving a user-plane data packet of the UE, an Application Function (application function, AF) may send the user-plane data packet to the UE through the bearer. The AF may further send a notification message to a PCRF to notify the PCRF of an attribute (that is, an attribute of a service stream, such as a type of the service stream) of the user-plane data packet.

S2. After receiving the notification message, the PCRF determines, according to the attribute information of the service stream, whether it is necessary to initiate an IP-CAN session modify process. If it is necessary to perform the initiation, the PCRF triggers a PDN-GW/PCEF to send control signaling such as an Update Bearer Request message or a Create Bearer Request (create bearer request) message to the S-GW. In this way, the QOS of the bearer of the UE can be improved.

The user-plane data packet in FIG. 7A may arrive at the S-GW before the control signaling. Therefore, the S-GW may deliver a downlink data notification message for the user-plane data packet first. In the prior art, the ISR is activated. Therefore, the S-GW will not deliver a downlink data notification message again for the control signaling before receiving a response message of the UE. As a result, the UE will not be paged preferentially.

Figure 7B:
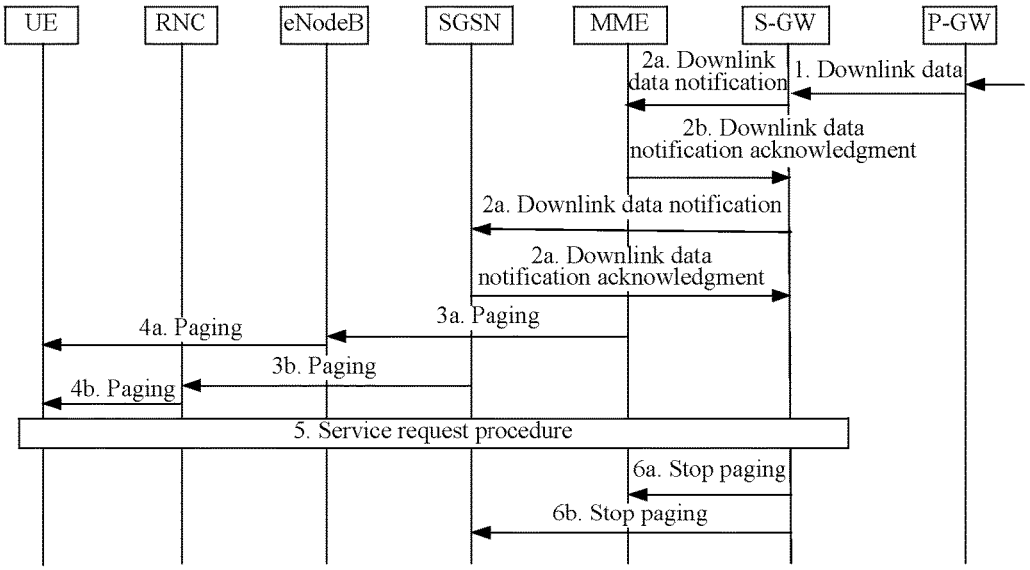
FIG. 7B is a flowchart of a service implementation method according to Embodiment 7 of the present invention.

As shown in FIG. 7B: S1. A P-GW sends a downlink data packet to an S-GW, where the downlink data packet may be a user-plane data packet or control signaling.

S2. The S-GW caches the received downlink data packet and delivers a downlink data notification message to an MME and an SGSN each. If the S-GW receives a downlink data packet of a UE again after delivering the downlink data notification message and before receiving a response message of the UE and the downlink data packet is a downlink data packet with a serving priority, the S-GW continues to deliver a downlink data notification message to the MME and the SGSN each, where the downlink data notification message includes information about a serving priority. The S-GW records "information about the sent paging trigger message with a serving priority". For example, a flag bit of a "notification indication of sent downlink data with a serving priority" is set. For another example, a flag bit of a "notification indication of sent preferential downlink data", information about a priority of a serving priority, and the like are set.

If the S-GW receives a downlink data packet with a serving priority again after setting the "information about the sent paging trigger message with a serving priority, the S-GW may skip sending a preferential downlink data notification message.

S3a. After receiving the downlink data notification message, the MME sends a paging message to an access network element such as an eNodeB. Specifically, after receiving a downlink data notification message for the first time, the MME sends a paging message to the eNodeB. After receiving a downlink data notification message again and determining that the downlink data notification message carries the information about a serving priority, the MME sends a paging message again to the eNodeB and records the information about a serving priority. Alternatively, if the downlink data notification message received by the MME includes the information about a serving priority, the MME may preferentially send a paging message to the access network element. In addition, the paging message sent by the MME may include the information about a serving priority.

S3b. After receiving the downlink data notification message, the SGSN sends a paging message to an access network element such as an RNC. Specifically, after receiving a downlink data notification message for the first time, the SGSN sends a paging message to the RNC. After receiving a downlink data notification message again and determining that the downlink data notification message carries the information about a serving priority, the SGSN sends a paging message again to the RNC and records the information about a serving priority. Alternatively, if the downlink data notification message received by the SGSN includes the information about a serving priority, the SGSN may preferentially send a paging message to the access network element. In addition, the paging message sent by the SGSN may include the information about a serving priority.

S4a. After receiving the paging message, the access network element eNodeB sends a paging message to the UE, so as to page the UE.

S4b. After receiving the paging message, the RNC sends a paging message to the UE, so as to page the UE.

In this embodiment, the access network element may also adopt the processing manner of the S-GW. That is, if the access network element determines that the received paging message is a paging message with a serving priority and determines that a paging message has been delivered to the UE, the mobility management element may deliver a paging message to the UE again and store "information about the sent paging message with a serving priority". For the specific implementation process for the access network element to deliver a paging message, reference may be made to a specific implementation process of a serving gateway described in each of the foregoing embodiments. Details are not repeated herein.

S5. After receiving the paging message, the UE initiates a service request procedure and establishes an air interface and a bearer of an S1 connection.

S6. After receiving a response message of the UE for the paging message, the S-GW stops paging. That is, even when receiving a downlink data packet with a higher priority, the S-GW does not send a downlink data notification message to the MME and the SGSN.

In Embodiment 7, after receiving the downlink data packet, the S-GW may not determine whether to deliver a paging trigger message to the MME and the SGSN and instead directly delivers a paging trigger message to the MME and the SGSN according to the received downlink data packet.

As can be seen from the description in Embodiment 7, after receiving a downlink data packet, the S-GW in Embodiment 7 may determine whether it is necessary to deliver a paging trigger message again to the MME and the SGSN by determining whether the downlink data packet is a downlink data packet with a serving priority and whether a paging trigger message has been delivered to the MME and the SGSN for the downlink data packet. In this way, even when the S-GW has been in the state of being forbidden to deliver a paging trigger message to the MME and the SGSN to relieve pressure on an air interface, the serving gateway is still capable of delivering a paging trigger message to the MME and the SGSN for a downlink data packet with a serving priority. A paging trigger message is delivered to the MME and the SGSN for a downlink data packet with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 8 provides a service implementation apparatus. The apparatus is a serving gateway. The apparatus is described below with reference to FIG. 8.

Figure 8:
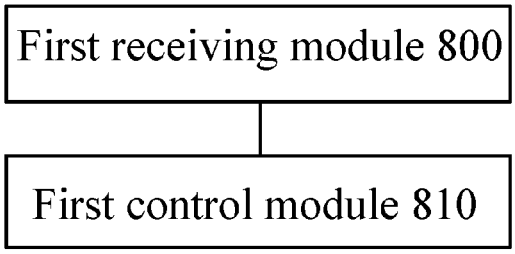
FIG. 8 is a schematic diagram of a service implementation apparatus according to Embodiment 8 of the present invention.

The service implementation apparatus shown in FIG. 8 includes a first receiving module 800 and a first control module 810.

The first receiving module 800 is configured to receive a downlink data packet of a terminal device sent by a packet data network gateway. The downlink data packet received by the first receiving module 800 may be a user-plane data packet or control signaling. The control signaling may be, for example, a create bearer request, a create dedicated bearer request, or an update bearer request.

The first control module 810 is configured to skip delivering a paging trigger message to a mobility management element if the downlink data packet received by the first receiving module 800 is a downlink data packet with a serving priority and the service implementation apparatus has delivered a paging trigger message with a serving priority to the mobility management element. The paging trigger message is used to enable the mobility management element to page the terminal device.

The first control module 810 may determine whether a paging trigger message with a serving priority has been delivered according to "information about the sent paging trigger message with a serving priority". For example, if the first control module 810 determines that the downlink data packet received by the first receiving module 800 is a downlink data packet with a serving priority and the serving gateway has recorded the "information about the sent paging trigger message with a serving priority", the first control module 810 skips delivering a paging trigger message to the mobility management element. The paging trigger message may specifically be a downlink data notification message or control signaling.

There are multiple manners for the first control module 810 to determine whether the downlink data packet received by the first receiving module 800 is a downlink data packet with a serving priority, as described in the foregoing method embodiments. Details are not repeated herein.

The "information about the sent paging trigger message with a serving priority" recorded by the serving gateway may be a "flag bit of sent downlink data with a serving priority", "information about a priority of a serving priority", or a "flag bit of sent downlink data with a serving priority" and "information about a priority of a serving priority". Certainly, the "information about the sent paging trigger message with a serving priority" may also adopt another setting manner.

When the "information about the sent paging trigger message with a serving priority" is a "flag bit of sent downlink data with a serving priority", "information about a priority of a serving priority", or a "flag bit of sent downlink data with a serving priority" and "information about a priority of a serving priority", operations specifically performed by the first control module 810 are as described in the foregoing method embodiments. Details are not repeated herein.

As can be seen from the description in Embodiment 8, after the first receiving module 800 receives a downlink data packet, the first control module 810 in Embodiment 8 may determine whether to skip delivering a paging trigger message to the mobility management element by determining whether the downlink data packet is a downlink data packet with a serving priority and whether a paging trigger message with a serving priority has been delivered to the mobility management element. In this case, the first control module 810 delivers a paging trigger message to the mobility management element only when the downlink data packet is a downlink data packet with a serving priority and no paging trigger message with a serving priority has been delivered to the mobility management element. In this way, even when the serving gateway has been in the state of being forbidden to deliver a paging trigger message to the mobility management element to relieve pressure on an air interface, the first control module 810 is still capable of delivering a paging trigger message to the mobility management element for a downlink data packet with a serving priority. The first control module 810 delivers a paging trigger message to the mobility management element for a downlink data packet with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 9 provides a service implementation apparatus. The apparatus is a serving gateway. The apparatus is described below with reference to FIG. 9.

Figure 9:
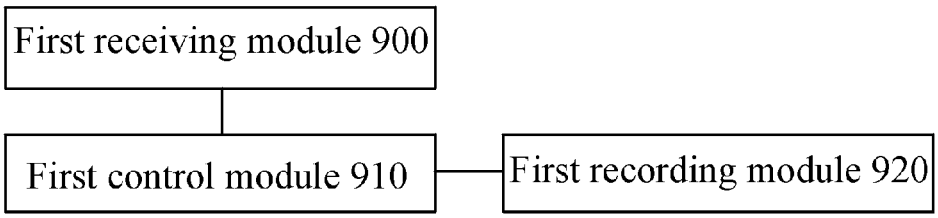
FIG. 9 is a schematic diagram of a service implementation apparatus according to Embodiment 9 of the present invention.

The service implementation apparatus shown in FIG. 9 includes a first receiving module 900 and a first control module 910. Alternatively, the apparatus may further include a first recording module 920.

The first receiving module 900 is configured to receive a downlink data packet of a terminal device sent by a packet data network gateway. The downlink data packet received by the first receiving module 900 may be a user-plane data packet or control signaling. The control signaling may be, for example, a create bearer request, a create dedicated bearer request, or an update bearer request.

The first control module 910 is configured to deliver a paging trigger message to a mobility management element if the downlink data packet received by the first receiving module 900 is a downlink data packet with a serving priority and the service implementation apparatus has delivered no paging trigger message with a serving priority. The paging trigger message is used to enable the mobility management element to page the terminal device.

The first recording module 920 is configured to record "information about the sent paging trigger message with a serving priority" after the first control module 910 sends the paging trigger message to the mobility management element.

The first control module 910 may determine whether a paging trigger message with a serving priority has been delivered according to the "information about the sent paging trigger message with a serving priority" recorded by the first recording module 920. For example, if the first control module 910 determines that the downlink data packet received by the first receiving module 900 is a downlink data packet with a serving priority and the first recording module 920 has recorded no "information about the sent paging trigger message with a serving priority", the first control module 910 delivers a paging trigger message to the mobility management element. The paging trigger message delivered by the first control module 910 to the mobility management element may specifically be a downlink data notification message, control signaling, or the like.

There are multiple manners for the first control module 910 to determine whether the downlink data packet received by the first receiving module 900 is a downlink data packet with a serving priority, as described in the foregoing method embodiments. Details are not repeated herein.

The "information about the sent paging trigger message with a serving priority" recorded by the first recording module 920 may be a "flag bit of sent downlink data with a serving priority", "information about a priority of a serving priority", or a "flag bit of sent downlink data with a serving priority" and "information about a priority of a serving priority". Certainly, the "information about the sent paging trigger message with a serving priority" may also adopt another setting manner.

When the "information about the sent paging trigger message with a serving priority" is a "flag bit of sent downlink data with a serving priority", "information about a priority of a serving priority", or a "flag bit of sent downlink data with a serving priority" and "information about a priority of a serving priority", operations specifically performed by the first control module 910 are as described in the foregoing method embodiments. Details are not repeated herein.

In this embodiment, the paging trigger message delivered by the first control module 910 to the mobility management element may include information about a serving priority, where the information about a serving priority may enable the mobility management element to preferentially page the terminal device. The information about a serving priority in the paging trigger message may include: a flag bit of a serving priority and/or information about a priority of a serving priority.

The mobility management element in this embodiment may include an MME and/or an SGSN. For example, in an application scenario in which the ISR is not activated, the first control module 910 may deliver a paging trigger message to the MME or the SGSN according to an access technology adopted by the terminal device, whereas in an application scenario in which the ISR is activated, the first control module 910 may deliver a paging trigger message to the MME and the SGSN each.

As can be seen from the description in Embodiment 9, after the first receiving module 900 receives a downlink data packet, the first control module 910 in Embodiment 9 may determine whether it is necessary to deliver a paging trigger message again to the mobility management element by determining whether the downlink data packet is a downlink data packet with a serving priority and whether a paging trigger message has been delivered to the mobility management element for the downlink data packet. In this way, even when the serving gateway has been in the state of being forbidden to deliver a paging trigger message to the mobility management element to relieve pressure on an air interface, the first control module 910 is still capable of delivering a paging trigger message to the mobility management element for a downlink data packet with a serving priority. The first control module 910 delivers a paging trigger message to the mobility management element for a downlink data packet with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 10 provides a service implementation apparatus. The apparatus is a mobility management element and the mobility management element is an MME, an SGSN, or the like. The apparatus is described below with reference to FIG. 10.

Figure 10:
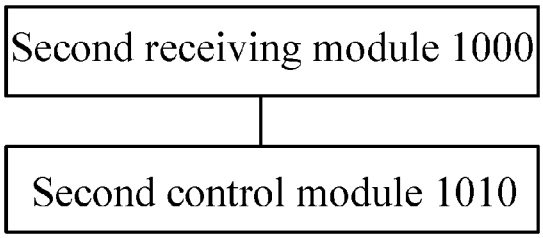
FIG. 10 is a schematic diagram of a service implementation apparatus according to Embodiment 10 of the present invention.

The service implementation apparatus shown in FIG. 10 includes a second receiving module 1000 and a second control module 1010.

The second receiving module 1000 is configured to receive a paging trigger message of a terminal device sent by a serving gateway.

The second control module 1010 is configured to skip delivering a paging message to an access network element if the paging trigger message received by the second receiving module 1000 is a paging trigger message with a serving priority and the service implementation apparatus has delivered a paging message with a serving priority to the access network element.

The second control module 1010 may determine, according to "information about the sent paging message with a serving priority", whether a paging message with a serving priority has been delivered to the access network element. For example, if the second control module 1010 determines that the paging trigger message received by the second receiving module 1000 is a paging trigger message with a serving priority and the mobility management element has recorded the "information about the sent paging message with a serving priority", the second control module 1010 skips delivering a paging message to the access network element. The specific name and specific included content of the paging message are not limited in this embodiment.

There are multiple manners for the second control module 1010 to determine whether the paging trigger message received by the second receiving module 1000 is a paging trigger message with a serving priority, as described in the foregoing method embodiments. Details are not repeated herein.

The "information about the sent paging message with a serving priority" may be a "flag bit of the sent paging message with a serving priority", "information about a priority of a serving priority", or a "flag bit of the sent paging message with a serving priority" and "information about a priority of a serving priority". Certainly, the "information about the sent paging message with a serving priority" may also adopt another setting manner. The specific presentation form of the "information about the sent paging message with a serving priority" is not limited in this embodiment.

When the "information about the sent paging message with a serving priority" is a "flag bit of the sent paging message with a serving priority", "information about a priority of a serving priority", or a "flag bit of the sent paging message with a serving priority" and "information about a priority of a serving priority", operations specifically performed by the second control module 1010 are as described in the foregoing method embodiments. Details are not repeated herein.

As can be seen from the description in Embodiment 10, after the second receiving module 1000 receives a paging trigger message, the second control module 1010 in Embodiment 10 may determine whether to skip delivering a paging message again to the access network element by determining whether the paging trigger message is a paging trigger message with a serving priority and whether the service implementation apparatus has delivered a paging message with a serving priority to the access network element. In this case, the second control module 1010 delivers a paging message to the access network element only when the paging trigger message is a paging trigger message with a serving priority and the service implementation apparatus has delivered no paging trigger message with a serving priority to the access network element. In this way, even when the mobility management element has been in the state of being forbidden to deliver a paging message to the access network element to relieve pressure on an air interface, the mobility management element is still capable of delivering a paging message to the access network element for a paging trigger message with a serving priority. The mobility management element delivers a paging message to the access network element for a paging trigger message with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 11 provides a service implementation apparatus. The apparatus is a mobility management element and the mobility management element is an MME, an SGSN, or the like. The apparatus is described below with reference to FIG. 11.

Figure 11:
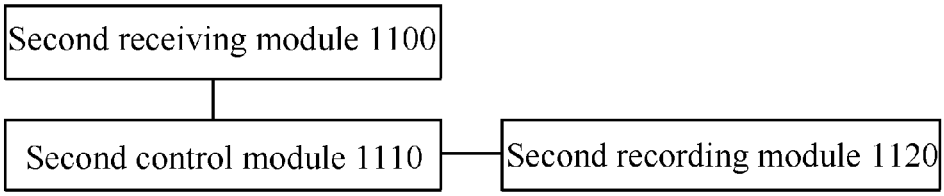
FIG. 11 is a schematic diagram of a service implementation apparatus according to Embodiment 11 of the present invention.

The service implementation apparatus shown in FIG. 11 includes a second receiving module 1100 and a second control module 1110. Alternatively, the apparatus may further include a second recording module 1120.

The second receiving module 1100 is configured to receive a paging trigger message of a terminal device sent by a serving gateway.

The second control module 1110 is configured to deliver a paging message to an access network element if the paging trigger message received by the second receiving module 1100 is a paging trigger message with a serving priority and the service implementation apparatus has sent no paging message with a serving priority to the access network element.

The second recording module 1120 is configured to record "information about the sent paging message with a serving priority" after the second control module 1110 sends the paging message to the access network element.

The second control module 1110 may determine, according to the "information about the sent paging message with a serving priority" recorded by the second recording module 1120, whether a paging message with a serving priority has been delivered to the access network element. For example, if the second control module 1110 determines that the paging trigger message received by the second receiving module 1100 is a paging trigger message with a serving priority and the second recording module 1120 has recorded no "information about the sent paging message with a serving priority", the second control module 1110 delivers a paging message to the access network element. The specific name and specific included content of the paging message are not limited in this embodiment.

There are multiple manners for the second control module 1110 to determine whether the paging trigger message received by the second receiving module 1100 is a paging trigger message with a serving priority, as described in the foregoing method embodiments. Details are not repeated herein.

The "information about the sent paging message with a serving priority" recorded by the second recording module 1120 may be a "flag bit of the sent paging message with a serving priority", "information about a priority of a serving priority", or a "flag bit of the sent paging message with a serving priority" and "information about a priority of a serving priority". Certainly, the "information about the sent paging message with a serving priority" may also adopt another setting manner. The specific presentation form of the "information about the sent paging message with a serving priority" is not limited in this embodiment.

When the "information about the sent paging message with a serving priority" recorded by the second recording module 1120 is a "flag bit of the sent paging message with a serving priority", "information about a priority of a serving priority", or a "flag bit of the sent paging message with a serving priority" and "information about a priority of a serving priority", operations specifically performed by the second control module 1110 are as described in the foregoing method embodiments. Details are not repeated herein.

In this embodiment, the paging message delivered by the second control module 1110 to the access network element may include information about a serving priority, where the information about a serving priority may enable an access device such as a base station to preferentially page the terminal device. The information about a serving priority in the paging message may include: a flag bit of a serving priority and/or information about a priority of a serving priority. The content specifically included in the information about a serving priority in the paging message is not limited in this embodiment.

As can been seen from the description in Embodiment 11, after the second receiving module 1100 receives a paging trigger message, the second control module 1110 in Embodiment 11 may determine whether it is necessary to deliver a paging message again to the access network element by determining whether the paging trigger message is a paging trigger message with a serving priority and whether a paging message with a serving priority has been delivered to the access network element. In this way, even when the mobility management element has been in the state of being forbidden to deliver a paging message to the access network element to relieve pressure on an air interface, the second control module 1110 is still capable of delivering a paging message to the access network element for a paging trigger message with a serving priority. The second control module 1110 delivers a paging message to the access network element for a paging trigger message with a serving priority. Therefore, pressure on an air interface is basically not increased in this embodiment. In this way, in this embodiment, a user with an eMPS capability is enabled to be paged in time while the pressure on the air interface can be reduced, thereby ensuring that the user with the eMPS capability has the priority to use network resources.

Embodiment 12 provides a service implementation system. This embodiment is described below with reference to FIG. 12.

Figure 12:
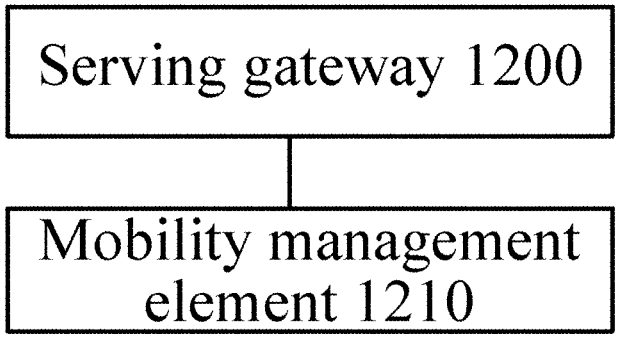
FIG. 12 is a schematic diagram of a service implementation apparatus according to Embodiment 12 of the present invention.

The system shown in FIG. 12 includes a mobility management element 1210 connected to a serving gateway 1200. Alternatively, the system may also include the serving gateway 1200. The mobility management element is, for example, an MME and/or an SGSN. Although FIG. 12 shows only one mobility management element 1210, there may be multiple mobility management elements 1210.

The serving gateway 1200 is configured to receive a downlink data packet of a terminal device sent by a packet data network gateway and deliver a paging trigger message to the mobility management element 1210. Alternatively, if the downlink data packet received by the serving gateway 1200 is a downlink data packet with a serving priority and the serving gateway 1200 has delivered a paging trigger message with a serving priority to the mobility management element 1210, the serving gateway 1200 skips delivering a paging trigger message to the mobility management element 1210. If the downlink data packet received by the serving gateway 1200 is a downlink data packet with a serving priority and the serving gateway 1200 has delivered no paging trigger message with a serving priority to the mobility management element 1210, the serving gateway 1200 delivers a paging trigger message to the mobility management element 1210. Alternatively, after sending the paging trigger message, the serving gateway 1200 records "information about the sent paging trigger message with a serving priority".

The mobility management element 1210 is configured to receive a paging trigger message of the terminal device sent by the serving gateway 1200, and if it is determined that the paging trigger message is a paging trigger message with a serving priority and a paging message with a serving priority has been delivered to an access network element, skip delivering a paging message to the access network element; or if it is determined that the paging trigger message is a paging trigger message with a serving priority and no paging message with a serving priority has been delivered to an access network element, deliver a paging message to the access network element. Alternatively, after sending the paging message to the access network element, the mobility management element 1210 records "information about the sent paging message with a serving priority".

Specifically performed operations, structures, and the like of the serving gateway 1200 and the mobility management element 1210 are as described in the foregoing method and apparatus embodiments. Details are not repeated herein.

Through the description of the preceding embodiments, persons skilled in the art may clearly understand that the present invention may be implemented by software plus a necessary hardware platform, and definitely may also be implemented by hardware, but in most cases, the former is a preferred implementation manner. Based on such understanding, part of or all of the technical solutions of the present invention that makes contributions to the prior art may be embodied in a form of a software product. The software product may be used to execute the foregoing method process. The computer software product may be stored in a readable storage medium, for example, a ROM/RAM, a magnetic disk, or an optical disk, and includes several instructions used to instruct a computer device (for example, a personal computer, a server, or a network device, and so on) to execute the method described in the embodiments of the present invention or a certain part of the embodiments.

Although the present invention is described through embodiments, persons of ordinary skill in the art should know that, a lot of variations and changes of the present invention without departing from the spirit of the present invention should be covered by the claims of the application document of the present invention.

What is claimed is:

1. A service implementation method, comprising:

receiving, by a serving gateway, a *first* data packet of a terminal device sent by a packet data network gateway;

*determining, by the serving gateway, that the first data packet is with a second priority according to information of a bearer corresponding to the first data packet, wherein the information comprises an allocation and retention priority (ARP) parameter;* determining, by the serving gateway, that [the data packet is a data packet with a second priority and] the second priority is higher than a first priority, wherein the first priority is a priority [of] *in* a first downlink data notification message sent to a mobility management entity[(MME)], *wherein the first downlink data notification message is for notifying coming of a second data packet and is for triggering paging the terminal*;

*in response to the second priority is higher than the first priority,* sending, by the serving gateway, a second downlink data notification message with the second priority to the [MME, wherein the determining that the data packet is with the second priority is according to information of a bearer corresponding to the data packet] *mobility management entity, wherein the sec-*

*ond downlink data notification message is for notifying coming of the first data packet and is for triggering paging the terminal.*

2. The method according to claim 1, further comprising: recording, by the serving gateway, the second priority.

3. The method according to claim 1, wherein the first priority is recorded by the serving gateway.

4. The method according to claim 1, wherein before the receiving, the method further comprises:

sending, by the serving gateway, the first downlink data notification message with the first priority to the [MME] *mobility management entity*.

5. The method according to claim 1, wherein a delay timer in the serving gateway is running.

6. The method according to claim 1, wherein the data packet comprises a user-plane data packet.

7. A serving gateway, comprising:

a receiver, configured to receive a *first* data packet of a terminal device sent by a packet data network gateway;

a processor, coupled to the receiver, configured to *determine that the first data packet is with a second priority according to information of a bearer corresponding to the first data packet, and* determine that [the data packet is a data packet with a second priority and] the second priority is higher than a first priority, wherein the first priority is a priority [of] *in* a first downlink data notification message sent to a [(MME)] *mobility management entity, wherein the first downlink data notification message is for notifying coming of a second data packet and is for triggering paging the terminal, and wherein the information comprises an allocation and retention priority (ARP) parameter;* a transmitter, coupled to the processor, configured to send a second downlink data notification message with the second priority to the [MME,] *mobility management entity in response to the second priority is higher than the first priority, wherein the second downlink data notification message is for notifying coming of the first data packet and is for triggering paging the terminal*

[wherein the processor determines the data packet is with the second priority according to information of a bearer corresponding to the data packet].

8. The serving gateway according to claim 7, wherein the processor is further configured to record the second priority.

9. The serving gateway according to claim 7, wherein the first priority is recorded by the serving gateway.

10. The serving gateway according to claim 7, wherein the transmitter is further configured to send the first downlink data notification message with the first priority to the [MME] *mobility management entity*.

11. The serving gateway according to claim 7, wherein a delay timer in the serving gateway is running.

12. The serving gateway according to claim 7, wherein the data packet comprises a user-plane data packet.

*13. A service implementation method, comprising:*

*receiving, by a mobility management element, a first paging trigger message of a terminal from a serving gateway, wherein the first paging trigger message comprises a first priority;*

*sending, by the mobility management element, a first paging message to a base station in response to the first paging trigger message;*

*receiving, by the mobility management element, a second paging trigger message of the terminal from the serving gateway before the mobility management element receives a response of the first paging message, wherein the second paging trigger message comprises a second priority;*

*determining, by the mobility management element, whether the second priority comprised in the second paging trigger message is higher than the first priority comprised in the first paging trigger message; and*

*sending, by the mobility management element, a second paging message to the base station, if the second priority is higher than the first priority; and*

*skipping, by the mobility management element, sending the second paging message to the base station if the second priority is not higher than the first priority.*

*14. The method according to claim 13, wherein the second paging message comprises the second priority.*

*15. The method according to claim 14, wherein the second paging trigger message is a downlink data notification message.*

*16. The method according to claim 15, further comprising:*

*paging preferentially, by the base station, the terminal according to the second priority comprised in the second paging message.*

*17. The method according to claim 15, further comprising:*

*sending, by the serving gateway, the first paging trigger message of the terminal to the mobility management element.*

*18. A mobility management element, comprising:*

*a processor; and*

*a computer readable storage medium storing one or more programs for execution by the processor, the one or more programs including instructions to:*

*receive a first paging trigger message of a terminal from a serving gateway, wherein the first paging trigger message comprises a first priority;*

*send a first paging message to a base station in response to the first paging trigger message;*

*receive a second paging trigger message of the terminal from the serving gateway before the mobility management element receives a response of the first paging message, wherein the second paging trigger message comprises a second priority;*

*determine whether the second priority comprised in the second paging trigger message is higher than the first priority comprised in the first paging trigger message; and*

*send a second paging message to the base station if the second priority is higher than the first priority; and*

*skip sending the second paging message to the base station if the second priority is not higher than the first priority.*

*19. The mobility management element according to claim 18, wherein the second paging message comprises the second priority.*

*20. The mobility management element according to claim 19, wherein the second paging trigger message is a downlink data notification message.*

*21. A communication system, comprising:*

*a mobility management element, configured to:*

*receive a first paging trigger message of a terminal from a serving gateway, wherein the first paging trigger message comprises a first priority;*

*send a first paging message to a base station in response to the first paging trigger message;*

*receive a second paging trigger message of the terminal from the serving gateway before the mobility*

*management element receives a response of the first paging message, wherein the second paging trigger message comprises a second priority;*

*determine whether the second priority comprised in the second paging trigger message is higher than the first priority comprised in the first paging trigger message; and*

*send a second paging message to the base station, if the second priority is higher than the first priority;*

*wherein the second paging message comprises the second priority; and*

*skip sending the second paging message to the base station if the second priority is not higher than the first priority;*

*the base station, configured to:*

*page preferentially the terminal according to the second priority comprised in the second paging message after receiving the second paging message from the mobility management element.*

*22. The method according to claim 2, further comprising:*

*receiving, by the serving gateway, another data packet of the terminal device from the packet data network gateway; and*

*skipping, by the serving gateway, based on a record of the second priority on the serving gateway, sending another downlink data notification message to the mobility management entity in response to the another data packet.*

*23. The serving gateway according to claim 8, wherein the processor is further configured to:*

*receive another data packet of the terminal device from the packet data network gateway; and*

*skip, based on a record of the second priority on the serving gateway, sending another downlink data notification message to the mobility management entity in response to the another data packet.*

*24. The method according to claim 13, further comprising:*

*receiving, by the mobility management element, a third paging trigger message of a terminal from a serving gateway, wherein the third paging trigger message comprises a third priority;*

*sending, by the mobility management element, a third paging message to a base station in response to the third paging trigger message;*

*receiving, by the mobility management element, a fourth paging trigger message of the terminal from the serving gateway before the mobility management element receives a response of the third paging message, wherein the fourth paging trigger message comprises a fourth priority;*

*determining, by the mobility management element, whether the fourth priority comprised in the fourth paging trigger message is higher than the third priority comprised in the third paging trigger message; and*

*skipping, by the mobility management element, sending a fourth paging message to the base station, in response to determining that the fourth priority is not higher than the third priority.*

* * * * *